United States Patent
Wimmershoff et al.

(10) Patent No.: US 11,753,036 B1
(45) Date of Patent: Sep. 12, 2023

(54) ENERGY CONSUMPTION CONTROL SYSTEMS AND METHODS FOR VEHICLES

(71) Applicant: Zoox, Inc., Foster City, CA (US)

(72) Inventors: Marc Wimmershoff, San Jose, CA (US); James William Vaisey Philbin, Palo Alto, CA (US); Sarah Tariq, Palo Alto, CA (US)

(73) Assignee: Zoox, Inc., Foster City, CA (US)

( * ) Notice: Subject to any disclaimer, the term of this patent is extended or adjusted under 35 U.S.C. 154(b) by 130 days.

(21) Appl. No.: 16/653,463

(22) Filed: Oct. 15, 2019

(51) Int. Cl.
| | |
|---|---|
| *B60W 60/00* | (2020.01) |
| *G07C 5/08* | (2006.01) |
| *B60L 50/60* | (2019.01) |
| *G05D 1/02* | (2020.01) |
| *G01S 13/931* | (2020.01) |
| *H04N 7/18* | (2006.01) |

(52) U.S. Cl.
CPC ........... *B60W 60/0023* (2020.02); *B60L 50/60* (2019.02); *G05D 1/0212* (2013.01); *G07C 5/085* (2013.01); *G01S 13/931* (2013.01); *G01S 2013/9323* (2020.01); *G01S 2013/9324* (2020.01); *H04N 7/18* (2013.01)

(58) Field of Classification Search
CPC ..... B60L 15/2045; B60L 3/12; B60L 2260/54; Y02T 10/70; Y02T 10/72; Y02T 90/16; B60L 3/0038; B60L 2260/52; B60L 2240/72; B60L 58/12; B60L 2240/66; B60L 2240/64; B60L 2250/16; B60Y 2200/91
See application file for complete search history.

(56) References Cited

U.S. PATENT DOCUMENTS

| | | | | |
|---|---|---|---|---|
| 6,437,688 B1* | 8/2002 | Kobayashi | ............ | G01S 15/931 180/167 |
| 2008/0077327 A1* | 3/2008 | Harris et al. | .......... | G01S 13/931 701/301 |
| 2016/0195927 A1* | 7/2016 | Lopez | .................. | G06F 3/013 348/78 |

(Continued)

FOREIGN PATENT DOCUMENTS

WO     2018134152 A1*    7/2018

OTHER PUBLICATIONS

Hans Christian Woithe, Ulrich Kremer, Feature based adaptive energy management of sensors on autonomous underwater vehicles, Ocean Engineering, Volume 97, 2015, Pages 21-29, ISSN 0029-8018 (Year: 2015).*

(Continued)

*Primary Examiner* — Shon G Foley
(74) *Attorney, Agent, or Firm* — Lee & Hayes, P.C.

(57) ABSTRACT

Energy consumption for a vehicle may be reduced based at least in part on an environment characteristic associated with the environment through which the vehicle travels or an operation characteristic associated with operation of the vehicle, thereby increasing an operational time of the vehicle. In some situations, reducing energy consumption may be associated with operation of one or more of a sensor (e.g., turning the sensor off, reducing a frequency or resolution of the sensor, etc.) and/or one or more processors associated with the vehicle (e.g., turning a processor off, reducing a rate of computation, etc.) based at least in part on one or more of the environment characteristic signal or the operation characteristic signal.

18 Claims, 5 Drawing Sheets

(56) References Cited

U.S. PATENT DOCUMENTS

2018/0150970 A1* 5/2018 Benini et al. ............ G06T 7/73
2020/0009970 A1* 1/2020 Yi ...................... B60L 15/2045
2020/0396384 A1* 12/2020 Hu et al. ......... H04N 5/232411
2020/0409361 A1* 12/2020 Herman et al. ........ G01S 13/04

OTHER PUBLICATIONS

Sorber et al. (Sorber, J., Banerjee, N., Corner, M.D., Rollins, S., 2005. Turducken: hierarchical power management for mobile devices. In: International Conference on Mobile Systems, Applications, and Services (Mobisys), Seattle, WA, Jun. 2005, pp. 261-274) (Year: 2005).*

Translation of WO-2018134152-A1 (Year: 2018).*

* cited by examiner

ENERGY CONSUMPTION CONTROL SYSTEMS AND METHODS FOR VEHICLES

BACKGROUND

A vehicle may include one or more batteries configured to supply electric power to a number of electrically-powered systems of the vehicle. For example, the vehicle may include one or more electric motors for propulsion, one or more computer systems for navigation, providing information, and/or controlling operation of one or more systems of the vehicle. The operation of such systems results in reducing the level of charge of the one or more batteries, which, once the battery charge is depleted, results in the need to reduce or cease operation of the vehicle while the one or more batteries are charged. This may reduce the range of operation and usefulness of the vehicle.

BRIEF DESCRIPTION OF THE DRAWINGS

The detailed description is described with reference to the accompanying figures. In the figures, the left-most digit(s) of a reference number identifies/identify the figure in which the reference number first appears. The same reference numbers in different figures indicate similar or identical items.

DETAILED DESCRIPTION

As mentioned above, a vehicle may include one or more electric motors for providing propulsion for the vehicle, one or more batteries for supplying electric power to the one or more electric motors or other electrically-powered devices of the vehicle, such as computing devices, lighting, instrumentation, audio systems, heating ventilation and air-conditioning (HVAC) systems, and/or, for semi- or fully-autonomous vehicles, one or more sensors and/or vehicle controllers configured to at least partially control maneuvering of the vehicle. This disclosure is generally directed to systems and methods for controlling energy consumption related to operation of a vehicle. According to some examples of the systems and methods, under certain environment characteristics and/or certain operation characteristics, the systems and methods may reduce energy consumption associated with operation of one or more sensors of and/or one or more other electrically-powered devices or systems of the vehicle. In some examples, this may result in more efficient use of electrical power of the vehicle and/or extend the range or duration of use of the vehicle between recharging cycles.

This disclosure is generally directed to a vehicle including an energy consumption control system. The vehicle may include one or more sensors configured to generate one or more sensor signals indicative of an environment through which the vehicle travels. The vehicle may also include an energy consumption control system. The energy consumption control system may include a sensor signal interpreter configured to determine an environment characteristic associated with the environment based at least in part on the one or more sensor signals. The energy consumption control system may also include a sensor signal interpreter configured to determine an environment characteristic associated with the environment based at least in part on the one or more sensor signals. For example, the environment characteristic may include one or more of environment data indicative of a location of the vehicle, a predicted location of the vehicle, a characteristic of a road on which the vehicle is traveling, a probability of encountering an object in the environment, or a characteristic of the road on which the vehicle is predicted to travel. The energy consumption control system may also include a vehicle status determiner configured to determine an operation characteristic associated with operation of the vehicle based at least in part on the one or more sensor signals and/or the environment characteristic. For example, the operation characteristic may include a speed of the vehicle, a predicted speed of the vehicle, a direction of travel of the vehicle, a predicted direction of travel of the vehicle, a path of the vehicle, and/or a predicted path of the vehicle. The energy consumption control system may also include an energy consumption adjuster configured to reduce energy consumption associated with operation of one or more of the sensors and/or one or more processors associated with the vehicle based at least in part on environment characteristic signal and/or the operation characteristic signal, while still maintaining a baseline level of sensing and processing to ensure safety of the vehicle, for example, as described herein.

For example, if the vehicle is traveling along a highway in a remote location, the probability of another vehicle, a pedestrian, a cyclist, and/or another object creating a potential collision with the vehicle may be relatively low. In some such situations, the energy consumption control system may be configured to reduce energy consumption associated with one or more of a plurality of sensors coupled to the vehicle. For example, the energy consumption adjuster may be configured to reduce the energy consumption associated with operation of at least one of the sensors by deactivating the sensor, reducing a frequency of operation of the sensor, and/or reducing a resolution of the sensor, thereby reducing energy consumption associated with operation of the sensor, while still maintaining a baseline level of sensing and processing to ensure safety of the vehicle. In another example, if the vehicle is traveling relatively slowly and/or in a location in which the probability of another vehicle, a pedestrian, a cyclist, and/or another object creating a potential collision with the vehicle may be relatively low, the energy consumption control system may be configured to reduce energy consumption associated with one or more of a plurality of sensors coupled to the vehicle. In another example, if two or more sensors have an at least partially overlapping field of view, for example, such that at least some of the sensor data is at least partially redundant, one or more of the sensors may be deactivated and/or its frequency of operation and/or resolution may be reduced. In some examples, if the vehicle includes one or more processors associated with processing sensor signals, the energy consumption adjuster may be configured to reduce energy consumption associated with operation of the one or more processors, for example, by deactivating one or more of the processors and/or reducing a frequency with which the one or more processors processes data associated with the sensor signals. In some example vehicles, the vehicle may include more than one processor configured to process data associated with sensor signals, and in some such examples, the energy consumption adjuster may be configured to deactivate one or more of the multiple processors (and/or otherwise throttling operations on the processor and/or operating at a lower power state), and process the sensor signals using a non-deactivated processor. In another example, if the vehicle is traveling in a first direction such that one end of the vehicle is a trailing end of the vehicle, and the vehicle includes one or more sensors mounted at the trailing end of the vehicle and configured to generate sensor signals indicative of the environment to the side of and/or behind the vehicle, the energy consumption adjuster may be configured to reduce energy consumption associated with operation of one or more of the sensors mounted at the trailing end of the vehicle and/or the one or more processors associated with processing data received from the one or more sensors.

The energy consumption control systems and methods described herein may improve a functioning of a computing device associated with the vehicle, for example, by reducing the amount of computing resources required to operate sensors and/or operate processors without substantially hindering the ability of the vehicle to operate safely. In some examples, reducing energy consumption may also reduce processing time, reduce memory usage, and substantially maintain the ability of the vehicle to operate safely. These and other improvements to the functioning of a computer are discussed herein.

The techniques described herein can be implemented in a number of ways. Example implementations are provided below with reference to the following figures. Although discussed in the context of an autonomous vehicle, the techniques described herein may be applied to a variety of systems that use electrical power during operation, and they are not limited to autonomous vehicles. For example, the systems and methods may be used in an aviation or nautical context. Additionally, the techniques described herein may be used with real data (e.g., captured using physical sensor(s)), simulated data (e.g., generated by a simulator), or any combination of the two.

Figure 1:
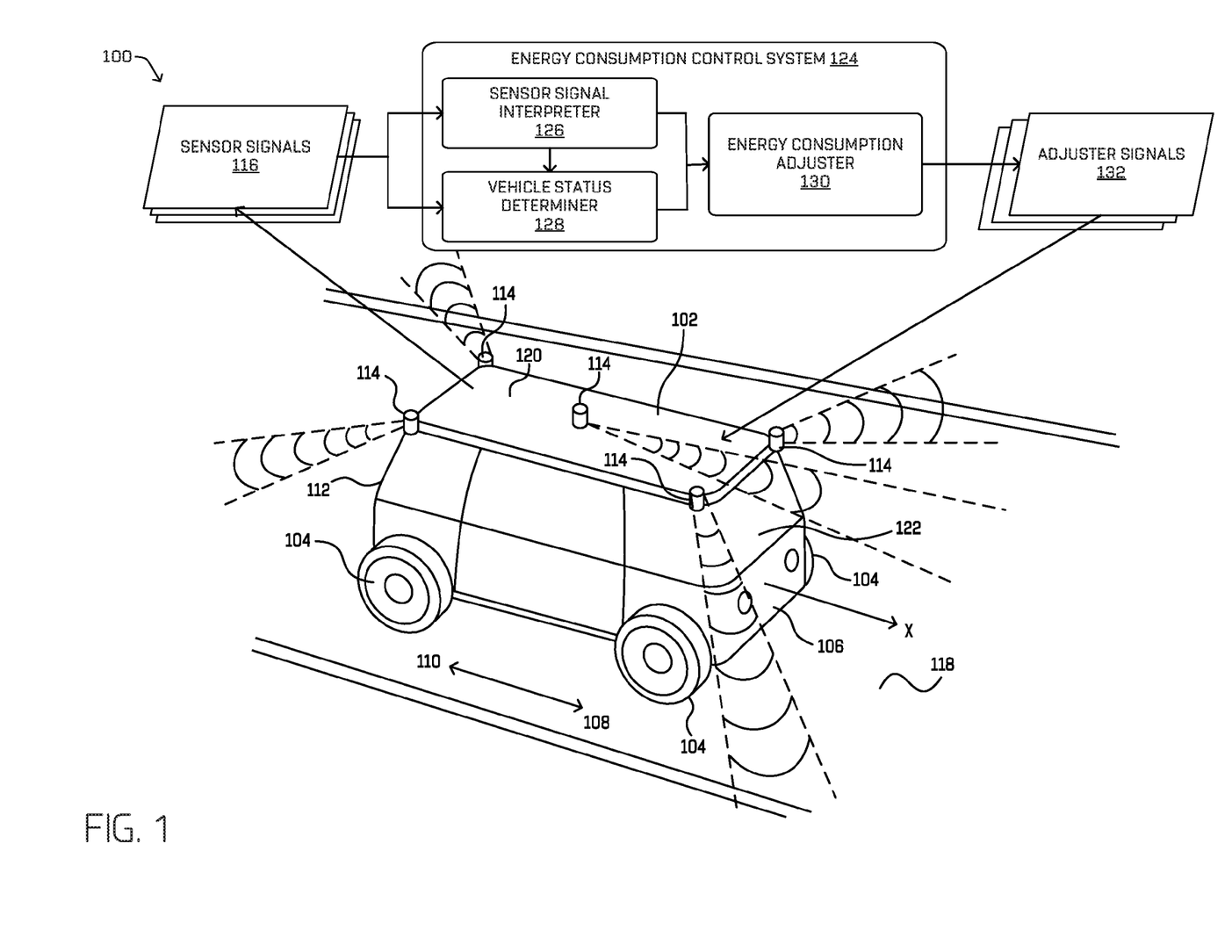
FIG. 1 is a perspective view of an example vehicle including example sensors capturing sensor data as the vehicle travels through an example environment.

FIG. 1 shows an example environment 100 through which an example vehicle 102 is traveling. The example vehicle 102 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 102 may be configured to control all functions from start to completion of the trip, including all parking functions, it may not include a driver and/or controls for driving the vehicle 102, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times to those that are partially or fully autonomously controlled.

The example vehicle 102 may be any configuration of vehicle, such as, for example, a van, a sport utility vehicle, a cross-over vehicle, a truck, a bus, an agricultural vehicle, and a construction vehicle. The vehicle 102 may be powered by one or more internal combustion engines, one or more electric motors, hydrogen power, any combination thereof, and/or any other suitable power sources. Although the example vehicle 102 has four wheels 104, the systems and methods described herein may be incorporated into vehicles having fewer or a greater number of wheels, tires, and/or tracks. In some examples, the vehicle 102 may be a bi-directional vehicle. For example, the vehicle 102 may have four-wheel steering and may operate generally with equal performance characteristics in all directions, for example, such that a first end 106 of the vehicle 102 is the front end (or leading end) of the vehicle 102 when traveling in a first direction 108, and such that the first end 106 becomes the rear end (or trailing end) of the vehicle 102 when traveling in the opposite, second direction 110, as shown in FIG. 1. Similarly, a second end 112 of the vehicle 102 is the front end (or leading end) of the vehicle 102 when traveling in the second direction 110, and such that the second end 112 becomes the rear end (or trailing end) of the vehicle 102 when traveling in the opposite, first direction 108. These example characteristics may facilitate greater maneuverability, for example, in small spaces or crowded environments, such as parking lots and urban areas.

The vehicle 102 may travel through the environment 100, relying at least in part on sensor data indicative of objects in the environment 100 in order to determine trajectories of the vehicle 102. For example, as the vehicle 102 travels through the environment 100, one or more sensors 114 may generate one or more sensor signals 116 indicative of the environment 100. For example, the one or more sensors 114 may include image capture devices (e.g., RGB-cameras, monochrome cameras, intensity (grey scale) cameras, infrared cameras, ultraviolet cameras, depth cameras, stereo cameras, and the like), light detection and ranging (LIDAR) sensors, radio detection and ranging (RADAR) sensors, one or more ultrasonic transducers, such as sound navigation and ranging (SONAR) sensors, microphones, or any combination thereof, mounted on the vehicle 102. The sensors 114 may be configured capture sensor data associated with detected objects (e.g., vehicles, pedestrians, cyclists, buildings, barriers, unevenness in the surface on which the vehicle 102 travels, etc.) and generate sensors signals 116 including the sensor data. In some examples, the sensor data may be used, for example, as input for determining trajectories for the vehicle 102 and/or for other purposes. As schematically depicted in FIG. 1, the vehicle 102 may travel on a surface 118, such as, for example, any road surface (e.g., tarmac, asphalt, gravel, etc.).

As shown in FIG. 1, the sensors 114 may be mounted to a portion of the vehicle 102 that provides a line-of-site view of a portion of the environment 100 around the vehicle 102, with at least some of the sensors 114 directed toward the direction of travel. As shown, the example sensors 114 may be mounted to a portion of a roof 120 approaching the upper edge of a windshield 122 or on top of the roof 120. The sensors 114 may be mounted at a location generally corresponding to the upper edge of the windshield 122. In examples in which the sensors 114 are mounted inside the windshield 122, any distortion of the data resulting from the windshield 122 may be corrected, for example, via lenses or algorithms configured to correct the data. If the vehicle 102 were to include two windshields 122 due to being bi-directional, sensors 114 may be mounted at a location generally corresponding to upper edges of the windshields 122.

Although the example sensors 114 shown are mounted to the roof 120, one or more of the sensors 114 may be mounted to other portions of the vehicle 102. For example, one or more of the sensors 114 may be mounted to the first end 106 and/or second end 112 of the vehicle 102, for example, at a location generally corresponding to the location of a bumper of a conventional car. According to some examples, sensors 114 may also be mounted to capture data associated with the surface 118 corresponding to the paths of each wheel 104 and/or on each side of the vehicle 102.

According to some examples, one or more of the sensors 114 may be mounted in fixed manner, for example, so that data captured from the sensors 114 are captured from a constant orientation relative to the vehicle 102. In such examples, the data may be captured from the same angle relative to the vehicle 102 in both the vertical and lateral directions. According to some examples, one or more of the sensors 114 may be mounted such that the orientation of the sensors 114 relative to the vehicle 102 may be changed, for example, in the vertical and/or lateral direction. In some examples, one or more sensors 114 may continually or intermittently rotate or oscillate, such that the orientation of the sensors 114 is not fixed and may, for example, sweep the environment 100 relative to the vehicle 102. In some examples, one or more of the sensors 114 may be configured to rotate in order to change orientation relative to the vehicle 102. For example, if the vehicle 102 is traveling at a higher speed or based on certain environmental conditions, the sensors 114 may be aimed farther beyond the front of the vehicle 102, so that there is relatively more time for the vehicle 102 to respond to the data obtained by the sensors 114. Conversely, if the vehicle 102 is traveling at a relatively slower speed and/or in a densely populated, or otherwise congested area, or based on other environment conditions, the sensors 114 may be aimed closer to the front of the vehicle 102. In some examples, the sensors 114 may be mounted to permit one or more of these changes in orientation.

As schematically depicted in FIG. 1, the vehicle 102 may include an energy consumption control system 124 configured to control energy consumption associated with operation of one or more electrically-powered systems associated with the vehicle 102. In some examples, the energy consumption control system 124 may include, for example, a sensor signal interpreter 126, a vehicle status determiner 128, and/or an energy consumption adjuster 130. As explained herein, the sensor signal interpreter 126 may be configured to determine an environment characteristic associated with the environment 100 through which the vehicle 102 travels, for example, based at least in part on one or more sensor signals 116. For example, the environment characteristic may include environment data indicative of a location of the vehicle 102, a predicted location of the vehicle 102, a characteristic of a road on which the vehicle 102 is traveling, a probability of encountering an object in the environment, and/or a characteristic of the road on which the vehicle 102 is predicted to travel, in addition to any other data available or derived therefrom (e.g., probabilities of objects based on previous experience, quantity of objects in the environment, map data, rules of the road, and the like). In some examples, the vehicle status determiner 128 may be configured to determine an operation characteristic associated with operation of the vehicle 102 based at least in part on one or more sensor signals 116 and/or the environment characteristic. For example, the operation characteristic may include one or more of a speed of the vehicle 102, a predicted speed of the vehicle 102, a direction of travel of the vehicle 102, a predicted direction of travel of the vehicle 102, a path of the vehicle 102, and/or a predicted path of the vehicle 102. The energy consumption adjuster 130, in some examples, may be configured to reduce energy consumption associated with operation of one or more of the sensors 114 and/or one or more processors associated with the vehicle 102 based at least in part on one or more environment characteristic signals and/or one or more operation characteristic signals, for example, as described herein. In some examples, the energy consumption adjuster 130 may be configured to generate one or more adjuster signals 132 configured to cause one or more of the sensors 114 and/or one or more of the processors associated with the vehicle 102 to reduce consumption of electrical power. For example, the adjuster signals 132 may be configured cause at least one of the sensors 114 to reduce energy consumption, for example, by deactivating the sensor 114, reducing a frequency of operation of the sensor 114, reducing a field of view of the sensor 114, and/or reducing a resolution of the sensor 114, thereby reducing energy consumption associated with operation of the sensor 114. In some examples, the adjuster signals 132 may be configured to cause at least one of the processors associated with the vehicle 102 to reduce energy consumption, for example, by deactivating one or more of the processors, throttling operations on the processor and/or operating at a lower power state, and/or reducing a frequency with which the one or more processors processes data associated with the sensor signals 116.

Figure 2:
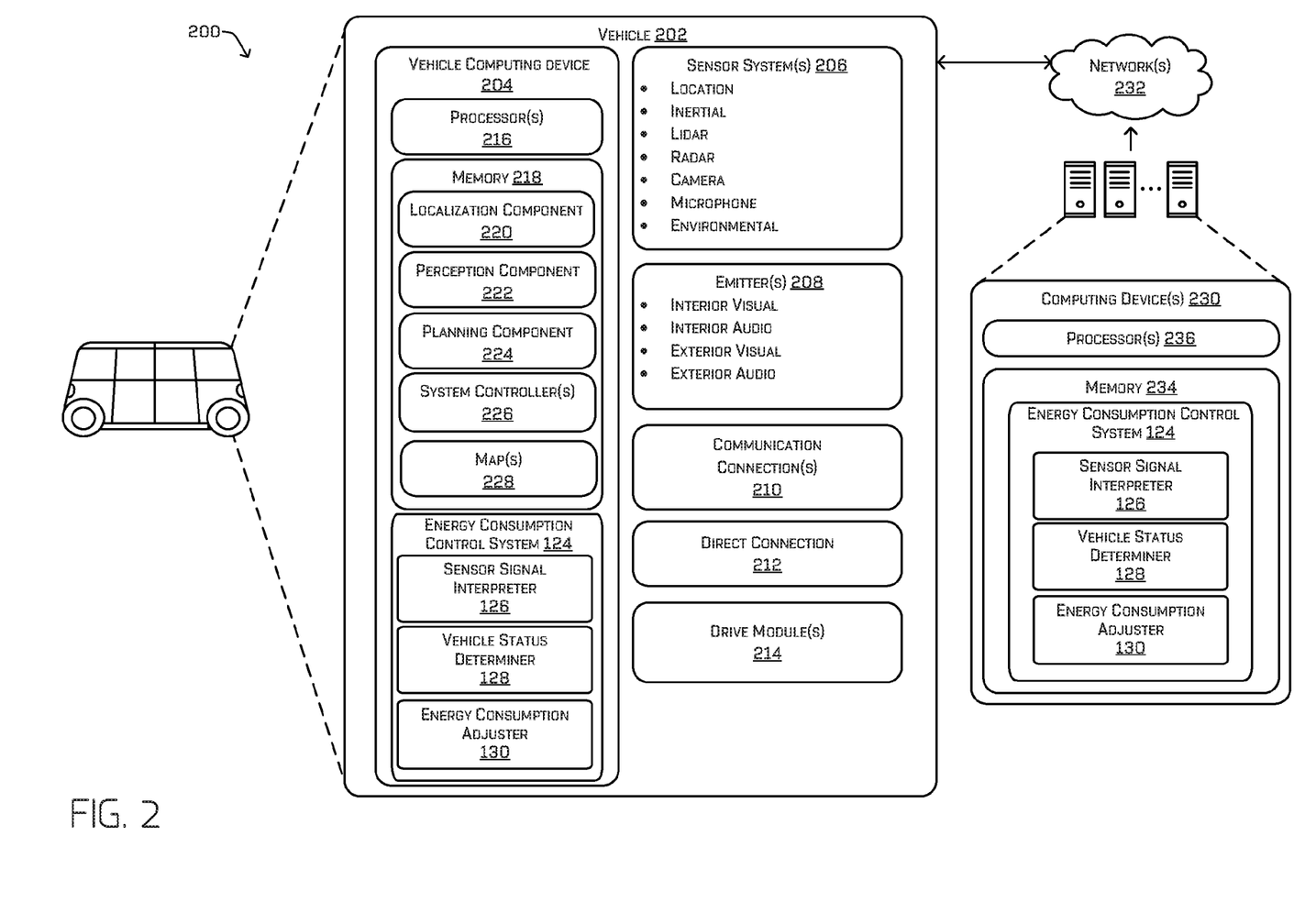
FIG. 2 is a block diagram of an example system for implementing example techniques described herein.

The sensor signal interpreter 126, the vehicle status determiner 128, and/or the energy consumption adjuster 130 may be incorporated into and/or embodied as part of one or more of the systems of the vehicle 102 described herein, and/or may be located remotely from the vehicle 102, for example, as explained herein with respect to FIG. 2.

FIG. 2 is an example vehicle systems architecture 200 for an example vehicle 202 (e.g., a partially or fully autonomous vehicle) for implementing techniques described herein. In some examples, the vehicle 202 may at least a partially correspond to the example vehicle 102 shown in FIG. 1. In the example shown in FIG. 2, the vehicle 202 may include an energy consumption control system 124, which may be configured to reduce energy consumption (e.g., electrical energy consumption) associated with one or more systems associated with a vehicle computing device 204 of the vehicle 202 and/or with one or more sensors 114 associated with one or more sensor system(s) 206 of the vehicle 202.

For example, the vehicle 202 may include a vehicle computing device 204, one or more sensor systems 206, one or more emitters 208, one or more communication connections 210, at least one direct connection 212, and one or more drive modules 214. The vehicle computing device 204 may include one or more processor(s) 216 and memory 218 communicatively coupled with the one or more processor(s) 216. In the illustrated example, the vehicle 202 is an autonomous vehicle. However, the vehicle 202 may be any other type of vehicle. In the illustrated example, the memory 218 of the vehicle computing device 204 stores a localization component 220, a perception component 222, a planning component 224, one or more system controllers 226, and one or more map(s) 228. Though depicted in FIG. 2 as residing in memory 218 for illustrative purposes, it is contemplated that the localization component 220, the perception component 222, the planning component 224, the one or more system controllers 226, and the one or more maps 228 may additionally, or alternatively, be accessible to the vehicle 202 (e.g., stored on, or otherwise accessible by, memory remote from the vehicle 202).

In at least one example, the localization component 220 may be configured to receive data from the sensor system(s) 206, for example, including one or more imagers, to determine a position and/or orientation of the vehicle 202 (e.g., one or more of an x-, y-, z-position, roll, pitch, or yaw). For example, the localization component 220 may include and/or request/receive a map of an environment and may continuously determine a location and/or orientation of the autonomous vehicle within the map. For example, the map may include image data, for example, as described herein. In some examples, the localization component 220 may utilize SLAM (simultaneous localization and mapping), CLAMS (calibration, localization and mapping, simultaneously), relative SLAM, bundle adjustment, non-linear least squares optimization, or the like to receive image data, LIDAR sensor data, radar data, IMU data, GPS data, wheel encoder data, and the like to accurately determine a location of the vehicle 202. In some examples, the localization component 220 may provide data to various components of the vehicle 202 to determine an initial position of an autonomous vehicle for generating a candidate trajectory, as discussed herein.

In some examples, the perception component 222 may be configured to perform object detection, segmentation, and/or classification. In some examples, the perception component 222 may provide processed sensor data that indicates a presence of an entity that is proximate to the vehicle 202 and/or a classification of the entity as an entity type (e.g., car, pedestrian, cyclist, animal, building, tree, road surface, curb, sidewalk, unknown, etc.). In additional and/or alternative examples, the perception component 222 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

In general, the planning component 224 may determine a path for the vehicle 202 to follow to traverse through an environment. For example, the planning component 224 may determine various routes and trajectories and various levels of detail. For example, the planning component 224 may determine a route to travel from a first location (e.g., a current location) to a second location (e.g., a target location). For the purpose of this discussion, a route may be a sequence of waypoints for traveling between two locations. As non-limiting examples, waypoints include streets, intersections, global positioning system (GPS) coordinates, etc. Further, the planning component 224 may generate an instruction for guiding the autonomous vehicle along at least a portion of the route from the first location to the second location. In at least one example, the planning component 224 may determine how to guide the vehicle 202 from a first waypoint in the sequence of waypoints to a second waypoint in the sequence of waypoints. In some examples, the instruction may be a trajectory or a portion of a trajectory. In some examples, multiple trajectories may be substantially simultaneously generated (e.g., within technical tolerances) in accordance with a receding horizon technique, wherein one of the multiple trajectories is selected for the vehicle 202 to navigate.

In at least one example, the planning component 224 may determine a location of a user based on image data of an environment received from the user using, for example, bags of binary words with image-based features, artificial neural network, and the like. Further, the planning component 224 may determine a pickup location associated with a location. A pickup location may be a specific location (e.g., a parking space, a loading zone, a portion of a ground surface, etc.) within a threshold distance of a location (e.g., an address or location associated with a dispatch request) where the vehicle 202 may stop to pick up a passenger. In at least one example, the planning component 224 may determine a pickup location based at least in part on determining a user identity (e.g., determined via image recognition or received as an indication from a user device, as discussed herein).

In at least one example, the vehicle computing device 204 may include one or more system controllers 226, which may be configured to control steering, propulsion, braking, safety, emitters, communication, and other systems of the vehicle 202. These system controller(s) 226 may communicate with and/or control corresponding systems of the drive module(s) 214 and/or other components of the vehicle 202.

The memory 218 may further include one or more map(s) 228 that may be used by the vehicle 202 to navigate within the environment. For the purpose of this application, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In some examples, a map may include a three-dimensional mesh of the environment. In some examples, the map may be stored in a tiled format, such that individual tiles of the map represent a discrete portion of an environment and may be loaded into working memory as needed. In at least one example, the one or more maps 228 may include at least one map (e.g., images and/or a mesh). In some examples, the vehicle 202 may be controlled based at least in part on the maps 228. That is, the maps 228 may be used in connection with the localization component 220, the perception component 222, and/or the planning component 224 to determine a location of the vehicle 202, identify objects in an environment, and/or generate routes and/or trajectories to navigate within an environment.

In some examples, the one or more maps 228 may be stored on a remote computing device(s) (such as computing device(s) 230) accessible via one or more network(s) 232. In some examples, multiple maps 228 may be stored based on, for example, a characteristic (e.g., type of entity, time of day, day of week, season of the year, etc.). Storing multiple maps 228 may have similar memory requirements but increase the speed at which data in a map may be accessed.

In some examples, aspects of some or all of the components discussed herein may include any models, algorithms, and/or machine learning algorithms. For example, in some examples, the components in the memory 218 and/or the memory 234 may be implemented as a neural network, for example, as described herein.

As described herein, an exemplary neural network is a biologically inspired algorithm which passes input data through a series of connected layers to produce an output. Each layer in a neural network may also include another neural network, or may include any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naive Bayes, Gaussian naive Bayes, multinomial naive Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks, such as, for example, ResNet50, ResNet101, VGG, DenseNet, PointNet, and the like.

In at least one example, the sensor system(s) 206 may include LIDAR sensors, RADAR sensors, ultrasonic transducers, SONAR sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time-of-flight (TOF), etc.), microphones, wheel encoders, environment sensors (e.g., temperature sensors, humidity sensors, light sensors, pressure sensors, etc.), etc. The sensor system(s) 206 may include multiple examples of each of these or other types of sensors. For example, the LIDAR sensors may include individual LIDAR sensors located at the corners, front, back, sides, and/or top of the vehicle 202. As another example, the camera sensors may include multiple cameras disposed at various locations about the exterior and/or interior of the vehicle 202. For example, one or more imagers may have at least partially overlapping views, for example, as described herein. The sensor system(s) 206 may provide input to the vehicle computing device 204. Additionally, or alternatively, the sensor system(s) 206 may send sensor data, via the one or more networks 232, to the one or more computing device(s) 230 at a particular frequency, after a lapse of a predetermined period of time, in near real-time, etc.

The vehicle 202 may also include one or more emitters 208 for emitting light and/or sound, as described above. The emitters 208 in this example include interior audio and visual emitters to communicate with passengers of the vehicle 202. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 208 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which including acoustic beam steering technology.

The vehicle 202 may also include one or more communication connection(s) 210 that enable communication between the vehicle 202 and one or more other local or remote computing device(s). For example, the communication connection(s) 210 may facilitate communication with other local computing device(s) on the vehicle 202 and/or the drive module(s) 214. Also, the communication connection(s) 210 may allow the vehicle 202 to communicate with other nearby computing device(s) (e.g., other nearby vehicles, traffic signals, etc.). The communications connection(s) 210 also enable the vehicle 202 to communicate with a remote teleoperations computing device or other remote services.

The communications connection(s) 210 may include physical and/or logical interfaces for connecting the vehicle computing device 204 to another computing device or a network, such as network(s) 232. For example, the communications connection(s) 210 may enable Wi-Fi-based communication, such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 202 may include one or more drive modules 214. In some examples, the vehicle 202 may have a single drive module 214. In at least one example, if the vehicle 202 has multiple drive modules 214, individual drive modules 214 may be positioned on opposite ends of the vehicle 202 (e.g., the front and the rear, etc.). In at least one example, the drive module(s) 214 may include one or more sensor systems to detect conditions of the drive module(s) 214 and/or the surroundings of the vehicle 202, for example, as described herein. By way of example and not limitation, the sensor system(s) 206 may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders may be unique to the drive module(s) 214.

In some cases, the sensor system(s) on the drive module(s) 214 may overlap or supplement corresponding systems of the vehicle 202 (e.g., sensor system(s) 206).

The drive module(s) 214 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 214 may include a drive module controller, which may receive and preprocess data from the sensor system(s) 206 and to control operation of the various vehicle systems. In some examples, the drive module controller may include one or more processors and memory communicatively coupled with the one or more processors. The memory may store one or more modules to perform various functionalities of the drive module(s) 214. Furthermore, the drive module(s) 214 also include one or more communication connection(s) that enable communication by the respective drive module with one or more other local or remote computing device(s).

In at least one example, the direct connection 212 may provide a physical interface to couple the one or more drive module(s) 214 with the body of the vehicle 202. For example, the direct connection 212 may allow the transfer of energy, fluids, air, data, etc. between the drive module(s) 214 and the vehicle 202. In some examples, the direct connection 212 may further releasably secure the drive module(s) 214 to the body of the vehicle 202.

In at least one example, the localization component 220, perception component 222, and/or the planning component 224 may process sensor data, as described above, and may send their respective outputs, over the one or more network(s) 232, to one or more computing device(s) 230. In at least one example, the localization component 220, the perception component 222, and/or the planning component 224 may send their respective outputs to the one or more computing device(s) 230 at a particular frequency, after a lapse of a predetermined period of time, in near real-time, etc. In some examples, the vehicle computing device 204 and/or the computing device 230 may include, individually or collectively, the energy consumption control system 124, including, for example, the sensor signal interpreter 126, the vehicle status determiner 128, and/or the energy consumption adjuster 130, as described herein. In some examples, the sensor signal interpreter 126, the vehicle status determiner 128, and/or the energy consumption adjuster 130 may be part of the localization component 220, the perception component 222, the planning component 224, and/or the system controller(s) 226.

The processor(s) 216 of the vehicle 202 and/or the processor(s) 236 of the computing device(s) 230 may include any suitable processor capable of executing instructions to process data and perform operations as described herein. By way of example and not limitation, the processor(s) 216 and 236 may include one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 218 and 234 are examples of non-transitory computer-readable media. The memory 218 and 234 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 2 is illustrated as a distributed system, in alternative examples, components of the vehicle 202 may be associated with the computing device(s) 230, and/or components of the computing device(s) 230 may be associated with the vehicle 202. That is, the vehicle 202 may perform one or more of the functions associated with the computing device(s) 230, and vice versa.

In various implementations, the parameter values and other data illustrated herein may be included in one or more data stores, and may be combined with other information not described or may be partitioned differently into more, fewer, or different data structures. In some implementations, data stores may be physically located in one memory or may be distributed among two or more memories.

Those skilled in the art will appreciate that the example architectures described herein are merely illustrative and are not intended to limit the scope of the present disclosure. In particular, the computing system and devices may include any combination of hardware or software that can perform the indicated functions, including computers, network devices, internet appliances, tablet computers, PDAs, wireless phones, pagers, etc. The architectures disclosed herein may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated architectures. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the architectures may be transmitted to the architectures via transmission media or signals such as electrical, electromagnetic, or digital signals, conveyed via a communication medium such as a wireless link. Various implementations may further include receiving, sending, or storing instructions and/or data implemented in accordance with the foregoing description on a computer-accessible medium. Accordingly, the techniques described herein may be practiced with other control system configurations. Additional information about the operations of the modules is discussed below.

Figure 3A:
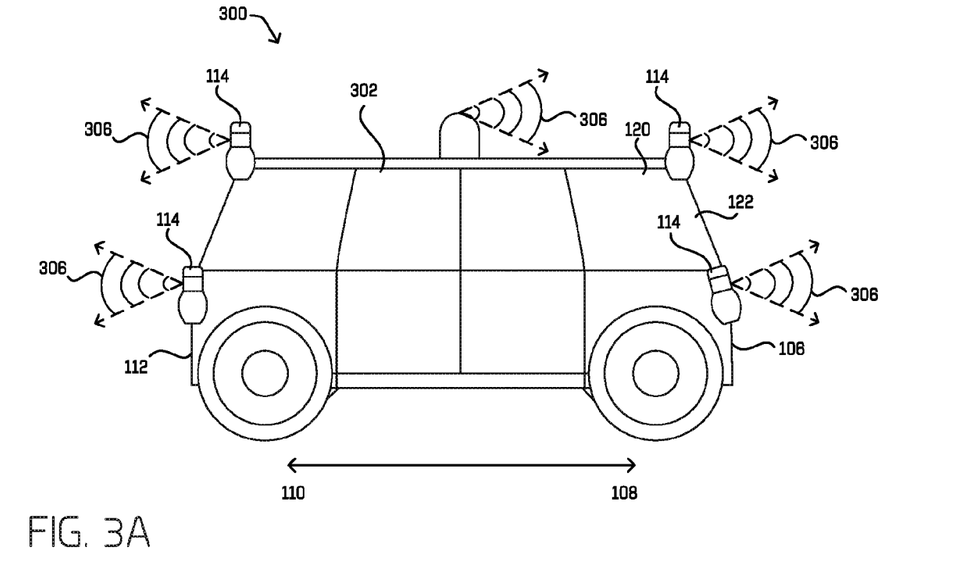
FIG. 3A is a side view of an example vehicle having multiple example sensors mounted to the vehicle at example locations on the vehicle.
Figure 3B:
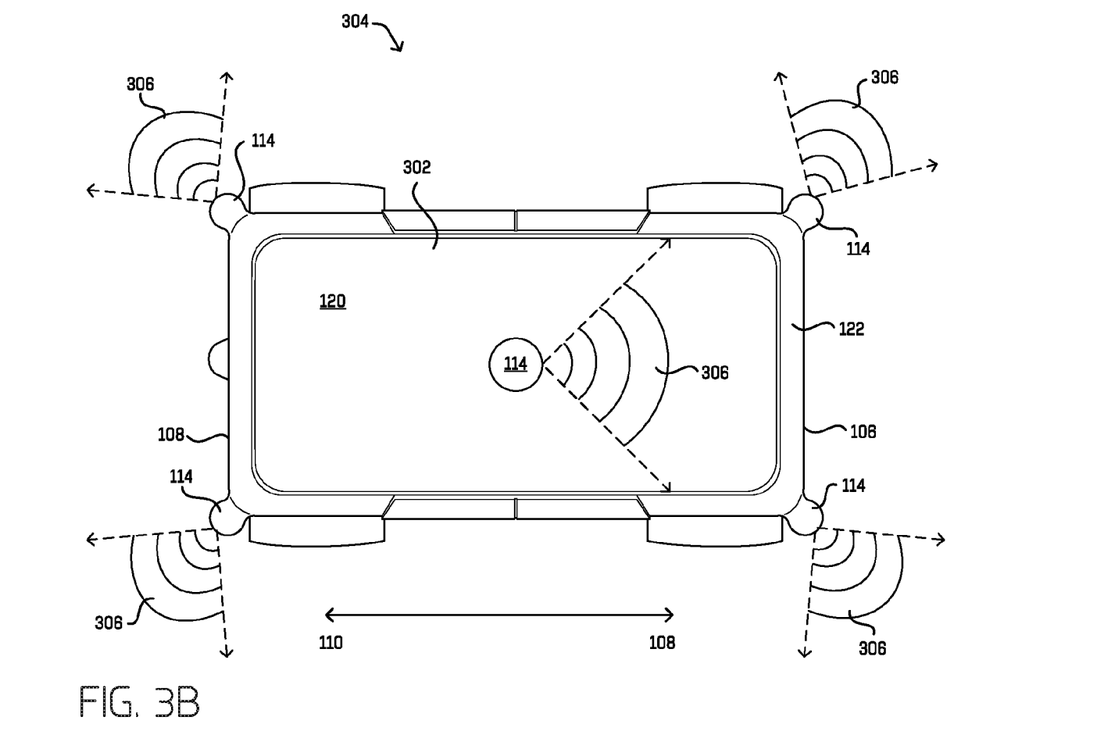
FIG. 3B is top view of the example vehicle shown in FIG. 3A.

FIG. 3A depicts a side view 300 of an example vehicle 302 having multiple sensors 114 mounted to the vehicle 302. The example vehicle 302 may correspond to the example vehicle 102 shown in FIG. 1 and/or the example vehicle 202 shown in FIG. 2. As shown in the side view 300, the vehicle 302 may include any number of sensors 114 in any combination or configuration. For example, the vehicle 302 includes at least nine sensors 114, as shown in FIGS. 3A and 3B. In some examples, the sensors 114 may include RADAR sensors, LIDAR sensors, SONAR sensors, image sensors, microphones, any other sensor types described herein, and/or combinations thereof. The vehicle 302 may also include any number and type of sensors and is not limited to the examples described herein. Additionally, as shown in the side view 300 and as described above, the sensors 114 may be mounted, such that the orientations of the respective sensors 114 are fixed relative to the vehicle 302. According to some examples, sensors 114 may also be mounted such that orientations of the respective sensors 114 may be altered relative to the vehicle 302. In some examples, the sensors 114 may be configured to change orientation, depending, for example, on vehicle speed and/or environmental conditions. In some examples, the sensors 114 may rotate and/or oscillate, such that orientations of respective sensors 114 are not fixed and may, for example, continually or intermittently sweep an area relative to the vehicle 302.

FIG. 3B depicts a top view 304 of the example vehicle 302 having multiple sensors 114 mounted to the vehicle 302. For example, the sensors 114 may be co-located or located proximate to one another, but may include different sensor types or modalities, for example, having respective fields of view 306 that differ from one another. As may be understood in the context of this disclosure, the vehicle 302 may include any number and any type of sensors. As may be understood in the context of this disclosure, the mounting locations and fields of view 306 may include any number of configurations.

Figure 4:
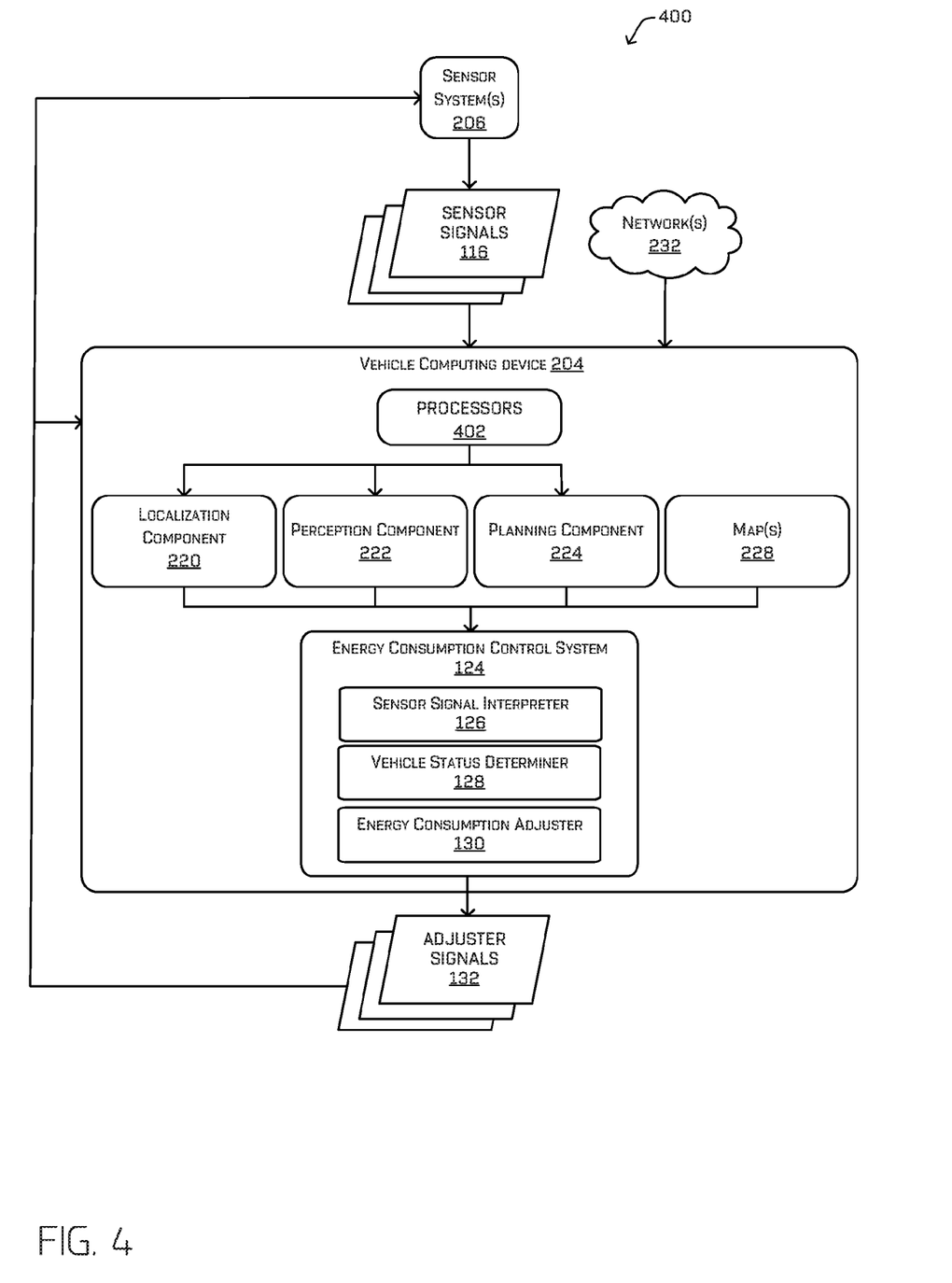
FIG. 4 is a block diagram including an example energy consumption control system for a vehicle and related systems of the vehicle.

FIG. 4 is a block diagram 400 including an example energy consumption control system 124 for a vehicle, for example, the vehicle 102 shown in FIG. 1, the vehicle 202 shown in FIG. 2, and/or the vehicle 302 shown in FIGS. 3A and 3B. As shown in FIG. 4, the sensor system(s) 206 of the vehicle generate sensor signals 116 indicative of the environment through which the vehicle travels. The sensor signals 116 may be communicated to and/or received by the vehicle computing device 204. In some examples, the senor signals may be communicated to computing device(s) 230 remote from the vehicle, for example, as shown and described with respect to FIG. 2. As described with respect to FIG. 2, the vehicle computing device 204 may include one or more processor(s) 216 and memory 218 configured to receive the sensor signals 116 and control operation of the vehicle. For example, one or more of the sensors of the sensor system(s) 206 may include an imager, and sensor signals 116 generated by the imager may be communicated to and/or received by one or more processors 402 (e.g., graphic processing unit(s)) configured to process sensor data in the sensor signals 116, for example, according to known image processing techniques.

As shown in FIG. 4, the example vehicle computing device 204 also includes a localization component 220, a perception component 222, a planning component 224, and map(s) 228, for example, as describe with respect to FIG. 2. In some examples, the localization component 220 may be configured to receive data from the sensor system(s) 206, for example, including one or more imagers, to determine a position and/or orientation of the vehicle. For example, the localization component 220 may include and/or request/receive a map of an environment and may continuously determine a location and/or orientation of the vehicle within the map. In some examples, the localization component 220 may to determine a location of the vehicle.

In some examples, the perception component 222 may be configured to perform object detection, segmentation, and/or classification. In some examples, the perception component 222 may provide processed sensor data (e.g., image data and/or data from other sensor types described herein) that indicates a presence of an entity that is proximate to the vehicle and/or a classification of the entity as an entity type (e.g., car, pedestrian, cyclist, animal, building, tree, road surface, curb, sidewalk, unknown, etc.). In additional and/or alternative examples, the perception component 222 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a number of entities in the environment, one or more probabilities of encountering an entity (e.g., which may be based on a classification of the entity (pedestrian, vehicle, cyclist, etc.)), a time of day, a day of a week, a season, a weather condition, an indication of darkness/light, etc.

In some examples, the planning component 224 may determine a path for the vehicle to follow to traverse through an environment. For example, the planning component 224 may determine various routes and trajectories and various levels of detail. For example, the planning component 224 may determine a route to travel from a first location (e.g., a current location) to a second location (e.g., a target location). In some examples, the planning component 224 may generate one or more instructions for guiding the vehicle along at least a portion of the route from the first location to the second location. In some examples, the planning component 224 may determine a pickup location associated with a location. A pickup location may be a specific location (e.g., a parking space, a loading zone, a portion of a ground surface, etc.) within a threshold distance of a location (e.g., an address or location associated with a dispatch request) where the vehicle may stop to pick up a passenger.

In some examples, the one or more map(s) 228 that may be used by the vehicle to navigate within the environment. In some examples, the vehicle may be controlled based at least in part on the map(s) 228. For example, the map(s) 228 may be used in association with the localization component 220, the perception component 222, and/or the planning component 224 to determine a location of the vehicle, identify objects in an environment, and/or generate routes and/or trajectories to navigate within an environment.

In the example shown in FIG. 4, the vehicle computing device 204 may include an energy consumption control system 124 configured to control the consumption of electrical energy by the vehicle. In some examples, the energy consumption control system 124 may be incorporated into one or more computing devices remote from the vehicle, for example, the computing device(s) 230 shown in FIG. 2. In some examples, the energy consumption control system 124 may be configured to receive and/or one or more sensor signals 116, one or more signals from the one or more processors 402 (e.g., GPUs), one or more signals from the localization component 220, one or more signals from the perception component 222, one or more signals from the planning component 224, and/or one more signals from the map(s) 228, and cause a reduction in consumption of electrical power associated with operation of the vehicle based on the one or more signals.

For example, the energy consumption control system 124 may be configured to reduce energy consumption associated with operation of one or more of the sensors 114 one or more processors of the vehicle computing device 204, and/or any other component or subcomponent of the vehicle 202 (e.g., lighting, braking, sound systems, HVAC, torque controllers, etc.), for example, based at least partially on environment characteristics associated with the environment through which the vehicle travels and/or operation characteristics associated with operation of the vehicle. For example, the energy consumption control system 124 may be configured communicate one or more adjuster signals 132 to the one or more sensors to reduce energy consumption associated with operation of the one or more sensors 114, for example, by deactivating the sensor (e.g., temporarily deactivating the sensor), reducing a frequency of operation of the sensor (e.g., reducing a frame rate of an imager), reducing a field of view of the sensor, and/or reducing a resolution of the sensor (e.g., reducing resolution of an imager). Regarding reducing energy consumption associated with operation of one or more processors, the energy consumption control system 124 may be configured to deactivate one or more processors (e.g., temporarily deactivate the one or more processors) or reduce a rate at which the one or more processors processes data associated with sensor signals generated by the one or more sensors. For example, some vehicles may include a plurality of GPUs configured to process imager sensor signals. In situations in which one or more imagers associated with the vehicle are deactivated or functioning at a reduced frame rate and/or resolution, the energy consumption control system 124 may be configured communicate one or more adjuster signals 132 to the one or more processors to deactivate or reduce operation of one or more of the GPUs in order to reduce consumption of electrical power. In some examples, one or more of the GPUs may be deactivated and the remaining activated GPU or GPUs may collectively process imager sensor signals. In some examples, based at least in part on one or more of the environment characteristics and/or operation characteristics associated with the vehicle, the energy consumption control system 124 may be configured to deactivate (e.g., temporarily deactivate) or reduce a rate at which the localization component 220, the perception component 222, and/or the planning component 224 processes the sensor signals 116 and/or other data received from other systems of the vehicle.

Of course, though depicted herein as external environmental data, the internal environment of such a vehicle is contemplated, as well. As a non-limiting example, sensors which detect the presence of a passenger in a vehicle (internal cameras, weight/pressure sensors, and the like) may be used to inform the energy consumption control system 124 to alter internal conditions of the vehicle (lighting, sound, temperature, etc.), for example, as determined based on the presence of passengers and balanced with determining the optimal energy state given other sensor input.

In some examples, the environment characteristics may include, for example, the location of the vehicle, a predicted location of the vehicle, characteristics of the road on which the vehicle is traveling, characteristics of the road on which the vehicle is predicted to travel, a probability of encountering an object in the environment, and/or any other characteristics associated with the environment through which the vehicle is traveling (e.g., weather-related conditions, construction-zone-related conditions, etc.). In some examples, the operation characteristics associated with the vehicle may include the speed of the vehicle, a predicted speed of the vehicle, the direction of travel of the vehicle, a predicted direction of travel of the vehicle, the path of the vehicle, a predicted path of the vehicle, and/or any other characteristics associated with operation of the vehicle (e.g., whether the vehicle is carrying a passenger, the level of charge associated with the one or more batteries supplying electrical power to the vehicle, etc.).

In some examples, the energy consumption control system 124 may be configured to reduce energy consumption associated with operation of one or more of the sensors 114 and/or one or more processors of the vehicle computing device 204, for example, based at least partially on environment characteristics and/or operation characteristics associated with the vehicle. For example, if the vehicle is traveling on a limited-access-highway, and thus, the probability of the vehicle encountering an object to avoid to prevent a collision is relatively low, the energy consumption control system 124 may generate one or more adjuster signals 132 to cause one or more of the sensors 114 to reduce energy consumption. For example, the vehicle computing device 204 may receive one or more sensor signals 116 from the one or more sensors 114 and/or information from other systems of the vehicle (e.g., GPS, the planning component 224, etc.), and the localization component 220 may determine the location and/or orientation of the vehicle, and that the vehicle is traveling on a limited-access-highway. Based on this information, in some examples, the sensor signal interpreter 126, which may be separate from or part of the localization component 220, the perception component 222, and/or the planning component 224, may determine environment characteristics associated with the vehicle. In addition, in some examples, based on the one or more sensor signals 116 and/or information from other systems of the vehicle (e.g., the perception component 222, the planning component 224, etc.), the vehicle status determiner 128, which may be separate from or part of the localization component 220, the perception component 222, and/or the planning component 224, may determine operation characteristics associated with operation of the vehicle, such as, for example, the speed of the vehicle, a predicted speed of the vehicle, a direction of travel of the vehicle, a predicted direction of travel of the vehicle, a path of the vehicle, or a predicted path of the vehicle. In some examples, based at least in part on the environment characteristics and/or the operation characteristics, the energy consumption adjuster 130 may determine whether conditions exist to reduce energy consumption of one or more of the sensors 114 or one or more of the processors of the vehicle computing device 204.

For example, while traveling on a limited-access-highway, the energy consumption adjuster 130 may determine that conditions permit deactivating or reducing the data capture rate (e.g., the frame rate of an imager) of one or more of the sensors 114. For example, sensors 114 located at the trailing end of the vehicle may be deactivated or the data capture rates and/or resolution may be reduced. For sensors 114 located at the leading end of the vehicle, the data capture rate and/or resolution of one or more of the sensors 114 may be reduced. In some examples, the processing rate of one or more of the processors (e.g., a GPU) may be reduced and/or one or more of the processors may be deactivated. In some examples, the energy consumption adjuster 130 may be configured to send one or more adjuster signals 132 to the one or more sensors 114 and/or the one or more processors identified for reduced energy consumption, thereby reducing (e.g., temporarily reducing) the energy consumption of those sensors and/or processors. In some examples, when one or more of the environment characteristics and/or the operation characteristics are no longer identified by the energy consumption control system 124, the energy consumption adjuster 130 may communicate one or more adjuster signals 132 to the one or more sensors 114 and/or the one or more processors operating at a reduced energy consumption level (or deactivated), so that the sensors 114 and/or processors may be restored to their respective previous energy consumption levels.

In another example, if the vehicle is traveling in a remote location, for example, where the probability of encountering an object with which to avoid a collision is relatively low, the energy consumption control system 124 may generate one or more adjuster signals 132 to cause one or more of the sensors 114 to reduce energy consumption. For example, the vehicle computing device 204 may receive one or more sensor signals 116 from the one or more sensors 114 and/or information from other systems of the vehicle (e.g., GPS, the planning component 224, etc.), and the localization component 220 may determine the location and/or orientation of the vehicle, for determining that the vehicle is traveling in a relatively remote location. Based on this information, in some examples, the sensor signal interpreter 126 may determine environment characteristics associated with the vehicle. In addition, in some examples, based on the one or more sensor signals 116 and/or information from other systems of the vehicle, the vehicle status determiner 128 may determine operation characteristics associated with operation of the vehicle, such as, for example, the speed of the vehicle, a predicted speed of the vehicle, a direction of travel of the vehicle, a predicted direction of travel of the vehicle, a path of the vehicle, or a predicted path of the vehicle.

For example, while traveling along a highway in a relatively remote location, the energy consumption adjuster 130 may determine that conditions permit deactivating or reducing the data capture rate (e.g., the frame rate of an imager) of one or more of the sensors 114. For example, sensors 114 located at the trailing end of the vehicle may be deactivated or the data capture rates may be reduced. For sensors 114 located at the leading end of the vehicle, the data capture rate of one or more of the sensors 114 may be reduced. In some examples, the processing rate of one or more of the processors may be reduced and/or one or more of the processors may be deactivated. In some examples, the energy consumption adjuster 130 may be configured to send one or more adjuster signals 132 to the one or more sensors and/or the one or more processors identified for reduced energy consumption, thereby reducing the energy consumption of those sensors and/or processors. In some examples, when one or more of the environment characteristics and/or the operation characteristics are no longer identified by the energy consumption control system 124 (e.g., the vehicle is no longer in a remote location and/or an increasing number of objects are detected by the perception component 222), the energy consumption adjuster 130 may communicate one or more adjuster signals 132 to the one or more sensors 114 and/or the one or more processors to restore their respective previous energy consumption levels.

In another example, if the vehicle is traveling on a divided highway, for example, having a barrier and/or a substantial median between the vehicle and one or more oncoming lanes of traffic, and thus, the probability of encountering an object from the left-hand side of the vehicle may be relatively low, the energy consumption control system 124 may generate one or more adjuster signals 132 to cause one or more of the sensors 114 on the left-hand side of the vehicle to reduce energy consumption. For example, the vehicle computing device 204 may receive one or more sensor signals 116 from the one or more sensors 114 and/or information from other systems of the vehicle (e.g., GPS, the planning component 224, etc.), and the localization component 220 may determine the location and/or orientation of the vehicle, for determining that the vehicle is traveling on a divided highway.

For example, while traveling in on a divided highway, the energy consumption adjuster 130 may determine that conditions permit deactivating or reducing the data capture rate (e.g., the frame rate of an imager) of one or more of the sensors 114, for example, one or more sensors 114 on the left-hand side of the vehicle. In some examples, the processing rate of one or more of the processors may be reduced and/or one or more of the processors may be deactivated. In some examples, the energy consumption adjuster 130 may be configured to send one or more adjuster signals 132 to the one or more sensors and/or the one or more processors identified for reduced energy consumption, thereby reducing the energy consumption of those sensors and/or processors. In some examples, when one or more of the environment characteristics and/or the operation characteristics are no longer identified by the energy consumption control system 124, the energy consumption adjuster 130 may communicate one or more adjuster signals 132 to the one or more sensors 114 and/or the one or more processors, such that their respective previous energy consumption levels may be restored.

In another example, if the planning component 224 of the vehicle determines that the vehicle is not changing lanes, the probability of encountering an object from behind the left- or right-hand side of the vehicle may be relatively low. In some such examples, the energy consumption control system 124 may generate one or more adjuster signals to cause one or more of the sensors 114 at the trailing end of the vehicle to reduce energy consumption.

In some examples, when the planning component 224 determines that no lane changes are planned for imminent execution, the energy consumption adjuster 130 may determine that conditions permit deactivating or reducing the data capture rate (e.g., the frame rate of an imager) of one or more of the sensors 114, for example, one or more sensors 114 on the trailing end of the vehicle. In some examples, the processing rate of one or more of the processors may be reduced and/or one or more of the processors may be deactivated. In some examples, the energy consumption adjuster 130 may be configured to send one or more adjuster signals 132 to the one or more sensors and/or the one or more processors identified for reduced energy consumption, thereby reducing the energy consumption of those sensors and/or processors. In some examples, when one or more of the environment characteristics and/or the operation characteristics are no longer identified by the energy consumption control system 124, the energy consumption adjuster 130 may communicate one or more adjuster signals 132 to the one or more sensors 114 and/or the one or more processors to restore their respective previous energy consumption levels.

Figure 5:
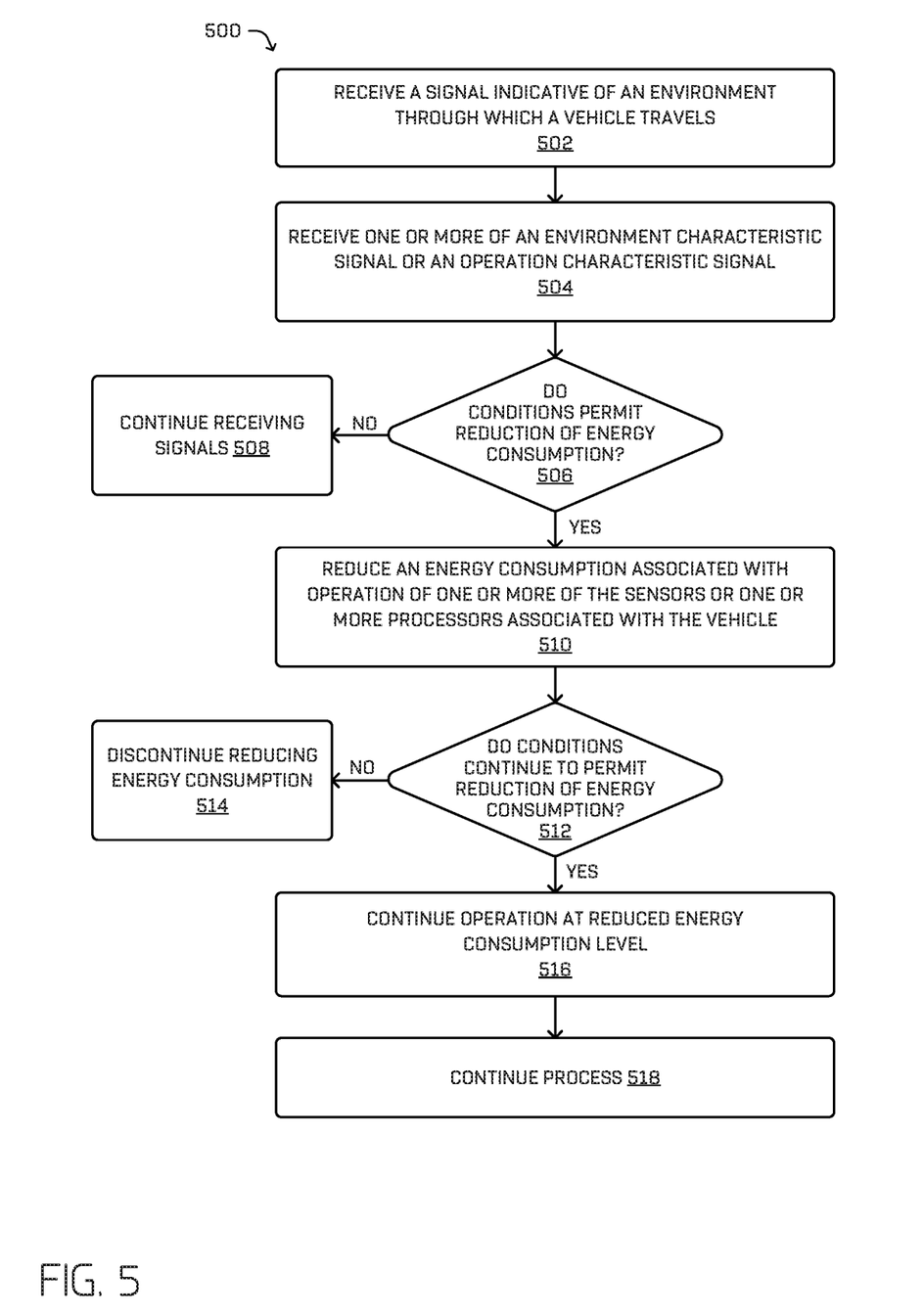
FIG. 5 is a flow diagram of an example process for controlling energy consumption associated with operation of an example vehicle.

FIG. 5 is a flow diagram of an example process illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 5 is a flow diagram of an example process 500 for controlling energy consumption associated with operation of a vehicle. At 502, the example process 500 may include receiving a signal indicative of an environment through which a vehicle travels. For example, the energy consumption control system may receive one or more sensor signals indicative of the environment through which the vehicle travels from one or more sensors coupled to the vehicle, for example, as described herein. In some examples, the signals indicative of the environment may be received from other, non-sensor sources, such as, for example, via one or more networks and/or one or more map signals.

At 504, the example process 500 may also include receiving (and/or determining) one or more of an environment characteristic signal or an operation characteristic signal. For example, one or more processors of the vehicle computing device may receive the one or more sensor signals and determine, based at least partially on the one or more sensor signals, one or more environment characteristic signals and/or one or more operation characteristic signals, which may be communicated to the energy consumption adjuster. In some examples, a sensor signal interpreter and/or a vehicle status determiner may be configured to determine the environment characteristics and/or the operation characteristics, for example, as described herein.

At 506, the example process 500 may include determining whether conditions permit reduction of energy consumption. For example, the environment characteristics and/or the operation characteristics associated with the vehicle may be indicative of conditions under which the energy consumption may be reduced. For example, as described herein, certain environment characteristics (e.g., travel on a limited-access-highway, travel in a remote location, travel on a divided highway, etc.) and/or certain operation characteristics (e.g., traveling slowly, not planning to change lanes, etc.) may result in conditions under which energy consumption levels associated with at least one of the sensors and/or at least one of the processors may be reduced by deactivating or altering operation of the sensors and/or processors, for example, as described herein.

If at 506 the conditions do not permit reduction of energy consumption, at 508, the example process 500 may include continuing to receive signals, for example, as described with respect to 502 and repeating 504. Alternatively, if at 506 the conditions permit reduction of energy consumption, at 510, the example process 500 may include reducing energy consumption associated with operation of one or more of the sensors and/or one or more processors associated with the vehicle, for example, as described herein.

Thereafter, at 512, in some examples, the process 500 may also include determining whether conditions continue to permit reduction of energy consumption. For example, 502, 504, and/or 506 may be repeated to determine whether the conditions that permitted the reduction of energy consumption continue to exist.

If at 512 the conditions permitting reduction of power do not continue exist, at 514, the example process 500 may include discontinuing reducing energy consumption. In some examples, the example process 500 may thereafter return to 502 and repeat 502, 504, 506, 508, 510, and/or 512. Alternatively, if at 512 the conditions permit continued reduction of energy consumption, at 516, the example process 500 may include continuing operation at reduced energy consumption levels. At 518, the example process 500 may continue, for example, by returning to 512 to determine whether conditions continue to permit operation at reduced energy consumption levels, for example, as described herein.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Based on the foregoing, it should be appreciated that technologies for deploying an occupant protection system have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

EXAMPLE CLAUSES

A. An example vehicle comprising:
a sensor configured to generate a sensor signal indicative of an environment through which the vehicle travels;
one or more processors; and
one or more non-transitory computer readable memory having instructions stored thereon which, when executed by the one or more processors cause the one or more processors to perform the operations of:
determining, based at least in part on a sensor signal, an environment characteristic associated with the environment;
determining, based at least in part on one or more of the sensor signal or the environment characteristic, an operation characteristic associated with operation of the vehicle; and
reducing, based at least in part on one or more of the environment characteristic or the operation characteristic, energy consumption of one or more systems of the vehicle.

B. The vehicle of example A, wherein reducing energy consumption comprises at least one of deactivating the sensor, reducing a frequency of operation of the sensor, reducing a field of view of the sensor, or reducing a resolution of the sensor.

C. The vehicle of example A or example B, wherein reducing energy consumption comprises one or more of deactivating at least one of the one or more processors, operating at least one of the one or more processors at a lower power state, or reducing a rate at which at least one of the one or more processors processes data associated with the sensor signal.

D. The vehicle of any one of example A through example C, wherein the operation characteristic comprises a direction of travel, the environment characteristic comprises a location of the vehicle, the sensor is coupled at an end of the vehicle opposite the direction of travel, and reducing the energy consumption comprises at least one of deactivating the sensor or reducing a field of view of the sensor.

E. The vehicle of any one of example A through example D, wherein:
the operation characteristic comprises at least one of a speed of the vehicle, a predicted speed of the vehicle, a direction of travel of the vehicle, a predicted direction of travel of the vehicle, a path of the vehicle, and/or a predicted path of the vehicle; and
the environment characteristic comprises at least one of a location of the vehicle, a predicted location of the vehicle, a characteristic of a road on which the vehicle is traveling, a characteristic of a road on which the vehicle is predicted to travel, or a probability of encountering an object in the environment.

F. One or more example non-transitory computer-readable media storing instructions executable by one or more processors, wherein the instructions, when executed, cause the one or more processors to perform operations comprising:
receiving one or more of an environment characteristic signal indicative of an environment characteristic associated with the environment or an operation characteristic signal indicative of an operation characteristic associated with operation of a vehicle; and
reducing energy consumption associated with operation of one or more of a sensor or one or more processors associated with the vehicle based at least in part on one or more of the environment characteristic signal or the operation characteristic signal.

G. The one or more non-transitory computer-readable media of example F, wherein reducing energy consumption associated with operation of the sensor comprises at least one of deactivating the sensor, reducing a frequency of operation of the sensor, reducing a field of view of the sensor, or reducing a resolution of the sensor.

H. The one or more non-transitory computer-readable media of example F or example G, wherein the one or more processors comprises a graphics processing unit (GPU), and wherein the reducing energy consumption associated with operation of the one or more processors comprises at least one of deactivating the GPU, operating the GPU at a lower power state, or reducing a frequency with which the GPU processes data associated with a sensor signal.

I. The one or more non-transitory computer-readable media of any one of example F through example H, wherein:
at least one of the one or more processors is configured to perform one or more of object detection, segmentation, or classification; and
reducing energy consumption associated with operation of the one or more processors comprises at least one of deactivating the at least one processor, operating the at least one processor at a lower power state, or reducing a frequency with which the at least one processor processes data.

J. The one or more non-transitory computer-readable media of any one of example F through example I, wherein the operations further comprise receiving a planner signal indicative of a predicted path associated with maneuvering of the vehicle, wherein reducing energy consumption comprises reducing energy consumption associated with operation of at least one of the sensors or the one or more processors based at least in part on the planner signal.

K. The one or more non-transitory computer-readable media of any one of example F through example J, wherein the sensor comprises one of an image sensor, a light detection and ranging (LIDAR) sensor, a radio detection and ranging (RADAR) sensor, a time-of-flight (TOF) sensor, or a sound navigation and ranging (SONAR) sensor.

L. The one or more non-transitory computer-readable media of any one of example F through example K, wherein the environment characteristic comprises one or more of a location of the vehicle, a predicted location of the vehicle, a characteristic of a road on which the vehicle is traveling, a characteristic of a road on which the vehicle is predicted to travel, or a probability of encountering an object in the environment.

M. The one or more non-transitory computer-readable media of any one of example F through example L, wherein:
the operations further comprise receiving a direction signal indicative of a direction of travel of the vehicle; and
reducing energy consumption comprises deactivating one or more rear sensors coupled to an end of the vehicle opposite the direction of travel, reducing a frequency of operation of the one or more rear sensors, reducing a field of view of the one or more rear sensors, or reducing a resolution of the one or more rear sensors.

N. The one or more non-transitory computer-readable media of any one of example F through example M, wherein reducing energy consumption associated with operation of one or more processors associated with operation of one or more sensors comprises one of deactivating at least one of the one more processors, operating at least one of the one or more processors at a lower power state, or reducing a frequency with which the one or more processors processes data associated with a sensor signal received from the one or more sensors.

O. An example method comprising:
receiving a signal indicative of an environment through which a vehicle travels;
receiving one or more of an environment characteristic signal indicative of an environment characteristic associated with the environment or an operation characteristic signal indicative of an operation characteristic associated with operation of the vehicle; and
reducing, based at least in part on one or more of the environment characteristic signal or the operation characteristic signal, energy consumption associated with operation of one or more of a sensor or one or more processors associated with a vehicle.

P. The method of example O, wherein reducing energy consumption comprises reducing energy consumption associated with operation of a sensor by one of deactivating the sensor, reducing a frequency of operation of the sensor, reducing a field of view of the sensor, or reducing a resolution of the sensor.

Q. The method of example O or example P, wherein reducing energy consumption comprises reducing energy consumption associated with operation of a graphics processing unit (GPU) by one of deactivating the GPU, operating the GPU at a lower power state, or reducing a frequency with which the GPU processes data associated with the sensor signal.

R. The method of any one of example O through example Q, wherein reducing energy consumption comprises reducing energy consumption associated with operation of a perception component associated with the vehicle by one of deactivating the perception component, operating the perception component at a lower power state, or reducing a frequency with which the perception component processes data, the perception component configured to perform one or more of object detection, segmentation, or classification.

S. The method of any one of example O through example R, wherein receiving one or more of the environment characteristic signal or the operation characteristic signal comprises receiving a planner signal indicative of a predicted path associated with maneuvering of the vehicle, and reducing energy consumption comprises reducing, based at least in part on the planner signal, energy consumption associated with operation of at least one of sensor or one or more processors configured to receive a sensor signal.

T. The method of any one of example O through example S, wherein receiving one or more of the environment characteristic signal or the operation characteristic signal comprises receiving a direction signal indicative of a direction of travel of the vehicle, and reducing energy consumption comprises deactivating one or more rear sensors coupled to an end of the vehicle opposite the direction of travel, reducing a frequency of operation of the one or more rear sensors, reducing a field of view of the one or more rear sensors, or reducing a resolution of the one or more rear sensors.

What is claimed is:
1. A vehicle comprising:
a sensor configured to generate a sensor signal indicative of an environment through which the vehicle travels;
one or more processors; and
one or more non-transitory computer readable memory having instructions stored thereon which, when executed by the one or more processors cause the one or more processors to perform operations comprising:
determining, based at least in part on a sensor signal, an environment characteristic associated with the environment;
determining, based at least in part on the sensor signal and the environment characteristic, an operation characteristic associated with operation of the vehicle; and
reducing, while the vehicle is moving and based at least in part on the environment characteristic and the operation characteristic, energy consumption of one or more systems of the vehicle,
wherein reducing the energy consumption comprises at least one of reducing a frequency of operation of the sensor, reducing a field of view of the sensor, reducing a resolution of the sensor, or if the sensor has a field of view that is at least partially redundant then deactivating the sensor, and
wherein:
the operation characteristic comprises a speed of the vehicle, and a direction of travel of the vehicle; and
the environment characteristic comprises a location of the vehicle and a characteristic of a road on which the vehicle is traveling.

2. The vehicle of claim 1, wherein reducing energy consumption comprises one or more of deactivating at least one of the one or more processors, operating at least one of the one or more processors at a lower power state, or reducing a rate at which at least one of the one or more processors processes data associated with the sensor signal.

3. The vehicle of claim 1, wherein the operation characteristic comprises a direction of travel, the environment characteristic comprises a location of the vehicle, the sensor is coupled at an end of the vehicle opposite the direction of travel, and reducing the energy consumption comprises at least one of deactivating the sensor or reducing a field of view of the sensor.

4. The vehicle of claim 1, operations further comprising:
altering, based at least in part on the operation characteristic or the environment characteristic, an orientation of the sensor to a position relative to the vehicle.

5. One or more non-transitory computer-readable media storing instructions executable by one or more processors, wherein the instructions, when executed, cause the one or more processors to perform operations comprising:
receiving an environment characteristic signal indicative of an environment characteristic associated with the environment and an operation characteristic signal indicative of an operation characteristic associated with operation of a vehicle; and
reducing, while the vehicle is moving, energy consumption associated with operation of one or more of a sensor or one or more processors associated with the vehicle based at least in part on the environment characteristic signal and the operation characteristic signal,
wherein reducing energy consumption associated with operation of the sensor comprises reducing a frequency of operation of the sensor, reducing a field of view of the sensor, reducing a resolution of the sensor, or if the sensor has a field of view that is at least partially redundant then deactivating the sensor, and
wherein:
the operation characteristic comprises a speed of the vehicle and a direction of travel of the vehicle; and the environment characteristic comprises a location of the vehicle and a characteristic of a road on which the vehicle is traveling.

6. The one or more non-transitory computer-readable media of claim 5, wherein the one or more processors comprises a graphics processing unit (GPU), and wherein the reducing energy consumption associated with operation of the one or more processors comprises at least one of deactivating the GPU, operating the GPU at a lower power state, or reducing a frequency with which the GPU processes data associated with a sensor signal.

7. The one or more non-transitory computer-readable media of claim 5, wherein:
at least one of the one or more processors is configured to perform one or more of object detection, segmentation, or classification; and
reducing energy consumption associated with operation of the one or more processors comprises at least one of deactivating the at least one processor, operating the at least one processor at a lower power state, or reducing a frequency with which the at least one processor processes data.

8. The one or more non-transitory computer-readable media of claim 5, wherein the operations further comprise receiving a planner signal indicative of a planned or predicted lane change, wherein reducing energy consumption comprises reducing energy consumption associated with operation of at least one of the sensors or the one or more processors based at least in part on the planner signal.

9. The one or more non-transitory computer-readable media of claim 5, wherein the sensor comprises one of an image sensor, a light detection and ranging (LIDAR) sensor, a radio detection and ranging (RADAR) sensor, a time-of-flight (TOF) sensor, or a sound navigation and ranging (SONAR) sensor.

10. The one or more non-transitory computer-readable media of claim 5, wherein:
the operations further comprise receiving a direction signal indicative of a direction of travel of the vehicle; and
reducing energy consumption comprises deactivating one or more rear sensors coupled to an end of the vehicle opposite the direction of travel, reducing a frequency of operation of the one or more rear sensors, reducing a field of view of the one or more rear sensors, or reducing a resolution of the one or more rear sensors.

11. The one or more non-transitory computer-readable media of claim 10, wherein reducing energy consumption associated with operation of one or more processors associated with operation of one or more sensors comprises one of deactivating at least one of the one more processors, operating at least one of the one or more processors at a lower power state, or reducing a frequency with which the one or more processors processes data associated with a sensor signal received from the one or more sensors.

12. The one or more non-transitory computer-readable media of claim 5, the operations further comprising:
altering, based at least in part on the operation characteristic or the environment characteristic, an orientation of the sensor to a position relative to the vehicle.

13. A method comprising:
receiving a signal indicative of an environment through which a vehicle travels;
receiving an environment characteristic signal indicative of an environment characteristic associated with the environment and an operation characteristic signal indicative of an operation characteristic associated with operation of the vehicle; and
reducing, while the vehicle is moving and based at least in part on the environment characteristic signal and the operation characteristic signal, energy consumption associated with operation of one or more of a sensor or one or more processors associated with a vehicle,
wherein reducing energy consumption comprises reducing energy consumption associated with operation of the sensor by one of reducing a frequency of operation of the sensor, reducing a field of view of the sensor, reducing a resolution of the sensor, or if the sensor has a field of view that is at least partially redundant then deactivating the sensor, and
wherein:
the operation characteristic comprises a speed of the vehicle and a direction of travel of the vehicle; and
the environment characteristic comprises a location of the vehicle and a characteristic of a road on which the vehicle is traveling.

14. The method of claim 13, wherein reducing energy consumption comprises reducing energy consumption associated with operation of a graphics processing unit (GPU) by one of deactivating the GPU, operating the GPU at a lower power state, or reducing a frequency with which the GPU processes data associated with a sensor signal.

15. The method of claim 13, wherein reducing energy consumption comprises reducing energy consumption associated with operation of a perception component associated with the vehicle by one of deactivating the perception component, operating the perception component at a lower power state, or reducing a frequency with which the perception component processes data, the perception component configured to perform one or more of object detection, segmentation, or classification.

16. The method of claim 13, wherein receiving one or more of the environment characteristic signal or the operation characteristic signal comprises receiving a planner signal indicative of a planned or predicted lane change, and reducing energy consumption comprises reducing, based at least in part on the planner signal, energy consumption associated with operation of at least one of sensor or one or more processors configured to receive a sensor signal.

17. The method of claim 13, wherein receiving one or more of the environment characteristic signal or the operation characteristic signal comprises receiving a direction signal indicative of a direction of travel of the vehicle, and reducing energy consumption comprises deactivating one or more rear sensors coupled to an end of the vehicle opposite the direction of travel, reducing a frequency of operation of the one or more rear sensors, reducing a field of view of the one or more rear sensors, or reducing a resolution of the one or more rear sensors.

18. The method of claim 13, further comprising:
altering, based at least in part on the operation characteristic or the environment characteristic, an orientation of the sensor to a position relative to the vehicle.

* * * * *